Patented Jan. 14, 1936

2,028,081

UNITED STATES PATENT OFFICE 2,028,081

HALOGENATED PHENYL-DIPHENYL OXIDE

Wesley C. Stoesser, Midland, Mich., assignor to The Dow Chemical Company, Midland, Mich., a corporation of Michigan No Drawing. Application March 2, 1934, Serial No. 713,689

21 Claims. (Cl. 260—150)

This invention concerns certain new compounds, viz. chlorinated and/or brominated phenyl-diphenyl oxides, and a method of making the same.

The phenyl-diphenyl oxides employed as beginning materials in preparing my new products are described in the copending application of myself and R. F. Marschner, Serial No. 696,380, filed November 2, 1933. In said co-pending application it is disclosed that said phenyl-diphenyl oxides may be prepared either by heating a metal phenate with a monohalo-diphenyl or by heating a metal salt of a hydroxy-diphenyl with a monohalo-benzene. The phenyl-diphenyl oxides so prepared have the general formula:—

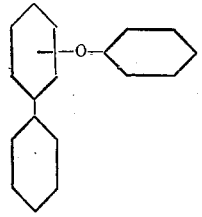

I have now found that, when a phenyl-diphenyl oxide, or a mixture of isomeric phenyl-diphenyl oxides, is chlorinated or brominated, products are obtained which, according to their increasing halogen content, vary in physical characteristics at room temperature from crystalline materials through the stage of viscous liquids to that of solid, non-crystalline resins. Even though only a single phenyl-diphenyl oxide be halogenated, the product usually consists of an intimate mixture of isomeric and other closely related compounds. Although individual compounds can in some instances be separated from such mixtures, the mixtures themselves possess physical and chemical properties which make them valuable commercial products. All of such mixtures are practically non-inflammable, are substantially stable against decomposition at high temperatures, e. g. 300°–350° C., possess high dielectric constants as compared with oil, have low electric power factors comparable with those of commonly used condenser oils, and are capable of withstanding exceptionally high electric potentials without breakdown. The invention, accordingly, provides a series of excellent dielectric materials which vary widely in physical characteristics and from which a dielectric material having the physical characteristics desired for special uses, e. g. in condensers, transformers, switch boxes, etc., may readily be chosen.

The liquid products are also well suited to use as heat storage and transfer agents. The resinous products can be used in plastics, varnishes, etc., and are particularly well adapted to such uses when the final products are to be employed for electric insulation purposes, e. g. as varnish films over electric wires.

In halogenating phenyl-diphenyl oxides, particularly at low temperatures, I find that the halogen employed tends to form addition as well as substitution compounds with the phenyl-diphenyl oxides. Such addition compounds, if permitted to remain in the product, decompose gradually to produce an acid condition, thereby impairing the dielectric properties of said product. I have found, however, that the formation of such addition compounds can be prevented by carrying the halogenation out at an elevated temperature, and also that when already formed said addition compounds can be destroyed by heating the reacted mixture. When such precautions are observed to destroy or prevent formation of the halogen addition compounds, the halogenated phenyl-diphenyl oxide product is permanently neutral.

To the accomplishment of the foregoing and related ends, the invention consists in the method and new products hereinafter fully described and particularly pointed out in the claims, the following description and examples setting forth in detail only certain of the various ways in which the principle of the invention may be employed.

The bromination of a phenyl-diphenyl oxide, or mixture of isomeric phenyl-diphenyl oxides, is preferably, though not necessarily carried out at a temperature above 75° C., and the corresponding chlorination is preferably carried out at a temperature above 145° C. If such halogenations are carried out at lower temperatures, part of the halogen usually adds to unsaturated linkages of the phenyl-diphenyl oxide molecule or radical to form addition compounds. However, the bromination or chlorination of phenyl-diphenyl oxide can, though less advantageously, be carried out at temperatures below the respective temperatures mentioned above, in which case the bromine addition compounds can be destroyed by heating the reacted mixture to a temperature above 75° C., preferably to between 250° and 350° C., and similarly, the chlorine addition compounds formed can be destroyed by heating the reacted mixture to a temperature above 145° C., preferably above 250° C.

In preparing my chlorinated products, chlorine is passed gradually into a liquefied phenyl-diphenyl oxide or mixture of isomeric phenyl-diphenyl oxides, either in the presence or absence of a solvent. The use of a solvent to thin the reaction mixture frequently results in smoother and more rapid chlorination than may be obtained in the absence of the solvent under otherwise similar operating conditions. The solvent employed should be one which is less susceptible to chlorination than are the phenyl-diphenyl oxide compounds under treatment and which can readily be separated from the chlorinated products by distillation. Among the various solvents which may be employed are: carbon tetrachloride, ethylene dichloride, acetylene tetrachloride, etc.

The chlorination may be carried out in the absence of a catalyst, but a chlorination catalyst, e. g. iron, ferric chloride, antimony chloride, aluminum chloride, etc., is preferably employed, particularly when highly chlorinated phenyl-diphenyl oxides are to be produced. In practice, I find it most convenient to carry the chlorination out in an iron reactor, in which case the surfaces of the reactor serve to catalyze the chlorination.

The extent of chlorination may be controlled either by reacting a measured quantity of chlorine with a predetermined quantity of phenyl-diphenyl oxide or by collecting the hydrogen chloride which is given off, periodically determining the gain in weight of the reaction mixture and the total quantity of hydrogen chloride evolved, and from such data calculating the proportion of combined chlorine in the product.

After the chlorination is completed, the reaction mixture is preferably washed with water or a dilute aqueous alkali solution to remove hydrogen chloride, and distilled under vacuum. The product so obtained is usually a viscous liquid or a solid, transparent resin at room temperature, although the products containing less than 3 atoms of combined chlorine per mol. of chlorinated phenyl-diphenyl oxide are in some instances crystalline.

Similar products may be obtained either by brominating a phenyl-diphenyl oxide or mixture of isomeric phenyl-diphenyl oxides, or by both brominating and chlorinating the same material to produce a mixture of halogenated phenyl-diphenyl oxides containing both bromine and chlorine in a single molecule.

The following examples describe several ways in which the principle of my invention has been employed, but are not to be construed as limiting the invention.

Example 1

256 grams (1 mol.) of a phenyl-diphenyl oxide mixture, consisting of approximately 80 per cent by weight ortho-phenyl-diphenyl oxide and 20 per cent its para isomer, was heated in a glass chlorination vessel to approximately 70° C., i. e. to a liquefying temperature. Approximately 71 grams (1 mol.) of chlorine was passed into the mixture in a period of about 1.5 hours, while maintaining the same at between 70° and 100° C. During the reaction the hydrogen chloride which was evolved from the mixture was collected. At the close of the chlorination it was found that the reaction mixture had increased in weight by 55 grams and that 18 grams of hydrogen chloride had been evolved, from which it was calculated that approximately 1 mol. of chlorine had been reacted. The mixture was heated to 350° C., whereby a considerable quantity of hydrogen chloride was driven off, and was maintained at said temperature until the evolution of hydrogen chloride had ceased. The mixture was then distilled under vacuum, whereby there was collected 267 grams of product distilling at between 225° and 265° C. at 30 millimeters pressure and containing approximately 12.7 per cent by weight of chlorine. The product was a yellow, viscous liquid at 45° C., but was partially solidified to a thick crystal slurry at room temperature. It was non-acidic and remained neutral on standing for more than 1 month.

Example 2

1 gram mol. of an approximately 80 per cent by weight ortho- and 20 per cent para-phenyl-diphenyl oxide mixture was reacted with 2 gram mols of chlorine under conditions similar to those described in Example 1. The chlorinated mixture was heated to 290° C. and blown with air to remove hydrogen chloride therefrom and was then distilled under vacuum, 291 grams of product, distilling at between 210° and 275° C. at 13 millimeters pressure, being collected. The product contained approximately 22.5 per cent of chlorine and was a yellow, viscous liquid at 60° C., but was largely solidified to a thick crystal slurry at room temperature. It was non-acidic and remained neutral on standing.

Example 3

246 grams (1 mol.) of ortho-phenyl-diphenyl oxide was reacted with 2 gram mols of chlorine at 180° C. in glass apparatus, the procedure involved being similar to that described in Example 1. Approximately 2 gram mols of hydrogen chloride was evolved and collected during the chlorination. The reacted mixture was distilled under vacuum, 283.4 grams of product distilling at between 210° and 275° C. at 13 millimeters pressure, being collected. The product contained approximately 22.5 per cent of chlorine. It was non-acidic and was similar in physical properties to the product obtained in Example 2.

Example 4

246 grams (1 mol.) of meta-phenyl-diphenyl oxide was reacted with approximately 213 grams (3 mols) of chlorine in glass apparatus. At the beginning of the reaction the temperature rose spontaneously to 90° C. without external heating. As the chlorination was continued, the mixture was converted to a thick liquid and it became necessary to heat the same, eventually to 200° C., in order to obtain rapid reaction. After the chlorination was completed, the mixture was heated to its boiling point for about 5 minutes, cooled, washed successively with a dilute aqueous sodium hydroxide solution and water, and was then distilled under vacuum. 316.5 grams of product, distilling at between 270° and 290° C. at 20–25 millimeters pressure, was collected. The product contained approximately 30.5 per cent of chlorine and was a light-yellow, viscous liquid at room temperature. It was found, at about 25° C., to possess the following electric properties:—dielectric constant, 4.14; power factor, 0.00085; potential required to cause sparking through 0.1 inch of material, greater than 32,000 volts.

Example 5

246 grams (1 mol.) of an approximately 80 per cent by weight ortho- and 20 per cent para-phenyl-diphenyl oxide mixture was dissolved in 100 cubic centimeters of ethylene dichloride and to the solution several small portions of iron were added. Chlorine was then passed into the mixture, while collecting hydrogen chloride evolved therefrom, until from the gain in weight of the mixture and the total quantity of hydrogen chloride collected, it was calculated that approximately 4 mols of chlorine had been reacted. The temperature during chlorination did not exceed 50° C. After the chlorination was completed, the mixture was heated under reflux for about 20 minutes, cooled, diluted with sufficient ethylene dichloride to form a thin solution, washed successively with a dilute sodium hydroxide solution and water, and distilled. There was collected 327.4 grams of product distilling at between 250° and 300° C. at 13 millimeters pressure. The product was a yellow, transparent, and extremely viscous liquid at room temperature. It contained 35.5 per cent of chlorine.

*Example 6*

A mixture of 246 grams (1 mol.) of ortho-phenyl-diphenyl oxide, 100 cubic centimeters of carbon tetrachloride, and 3 grams of iron filings was placed in a glass chlorination vessel. 653 grams (4.07 mols) of bromine was then added gradually during a period of 4 hours. Toward the end of the reaction it was found necessary to heat the mixture under reflux in order to obtain satisfactorily rapid reaction. After the bromination was completed, the mixture was washed successively with an aqueous sodium hydroxide solution and water, and was then distilled. 474 grams of product, distilling at between 315° and 345° C. at 16 millimeters pressure, was collected. The product contained approximately 57 per cent of bromine and was a hard, yellow, transparent resin at room temperature.

*Example 7*

The bromination described in Example 6 was repeated using 100 cubic centimeters of ethylene dichloride, instead of carbon tetrachloride, as a solvent. All of the bromine was added gradually during a period of only 1.5 hours, and it was found that the bromine reacted nearly as rapidly as it was added. The brominated product was substantially identical with that obtained in Example 6.

*Example 8*

418 grams (1.7 mols) of an approximately 80 per cent ortho- and 20 per cent para-phenyl-diphenyl oxide mixture was placed in an iron chlorination apparatus and was treated with chlorine at between 150° and 160° C. until the quantity of hydrogen chloride evolved and the gain in weight of the reaction mixture indicated that 5 mols of chlorine had been reacted per mol. of phenyl-diphenyl oxide employed. 100 grams of the mixture was then removed from the reactor and distilled under vacuum, 67.7 grams of product distilling at between 270° and 300° C. at 15 millimeters pressure being collected. The product contained approximately 42 per cent of chlorine and was a yellow, transparent, plastic resin.

*Example 9*

The main body of reaction mixture remaining after removal of the sample of chlorinated material in Example 8 was further chlorinated at 175° C. until the gain in weight of the reaction mixture and the quantity of hydrogen chloride evolved indicated that sufficient chlorine had been reacted to form a product having a chlorine content corresponding to that of hexachloro-phenyl-diphenyl oxide. 102 grams of the reaction mixture was then removed, washed successively with aqueous sodium hydroxide and water, and distilled. 65.2 grams of product, distilling at between 285° and 315° C. at 15 millimeters pressure, was collected. The product contained approximately 47 per cent of chlorine and was a hard, transparent resin which would chip when struck with the point of a knife.

*Example 10*

The main body of reaction mixture remaining after removal of the product in Example 9 was again chlorinated at approximately 175° C. until the gain in weight of the mixture and the total quantity of hydrogen chloride evolved indicated that sufficient chlorine had been reacted to form heptachloro-phenyl-diphenyl oxide. The reacted mixture was washed successively with aqueous sodium hydroxide and water, and distilled under vacuum, whereby 396 grams of product was collected. The product was a hard, amber colored, transparent resin containing 51.5 per cent by weight of chlorine. It was only slightly soluble in methyl and ethyl alcohols, but was very soluble in most other organic solvents, e. g. carbon tetrachloride, ether, naphtha, benzene, etc. It had the specific gravity 1.57 at 28° C. and was found by the "A. S. T. M. ball and ring method" to soften at 63° C.

*Example 11*

418 grams (1.7 mols) of a mixture consisting of approximately 80 per cent ortho- and 20 per cent para-phenyl-diphenyl oxide was chlorinated in an iron reactor and in the presence of 21 grams of antimony trichloride at between 180° and 200° C. until approximately 966 grams (13.6 mols) of chlorine had been reacted. The mixture was then distilled under vacuum, the fraction of material distilling at above 300° C. at 18 millimeters pressure being collected. Said fraction of distillate was washed successively with aqueous sodium hydroxide and water, and again distilled under vacuum, 708.5 grams of product distilling at between 300° and 330° C. at 18 millimeters pressure being collected. The product contained approximately 54 per cent of chlorine and was a hard, yellow to amber colored resin at room temperature. It possessed the specific gravity 1.62 at 32° C. The softening point, according to the "A. S. T. M. ball and ring method" was 72° C.

In addition to the foregoing examples, we have brominated pure ortho-phenyl-diphenyl oxide to obtain products corresponding in average bromine content to monobromo-, dibromo-, and tribromo-phenyl-diphenyl oxides, respectively. The products corresponding to monobromo- and dibromo-phenyl-diphenyl oxide were crystalline at room temperature, although the crystals of dibrominated material appeared to be somewhat oily. The product corresponding to tribromo-phenyl-diphenyl oxide was a thick crystal slurry at room temperature.

We have also both brominated and chlorinated phenyl-diphenyl oxide to obtain products containing both bromine and chlorine in the same molecule, e. g. a product having an average halogen content of 4.4 per cent bromine and 43 per cent chlorine by weight, and another product having an average halogen content of 31.6 per cent bromine and 21 per cent chlorine. Each of the products just mentioned were transparent, non-crystalline resins, that containing 4.4 per cent of bromine being somewhat plastic and that containing 31.6 per cent of bromine being hard at room temperature.

From the foregoing examples and illustrations it may be seen:—

(1) That my brominated products which contain from 1 to 3 atoms of combined bromine per mol. of brominated phenyl-diphenyl oxide are partially or completely crystalline at room temperature;

(2) Similarly, that my chlorinated products containing chlorine in amount corresponding to from 1 to 2 atoms of combined chlorine per mol of chlorinated phenyl-diphenyl oxide are partially or completely crystalline at room temperature;

(3) That my chlorinated meta-phenyl-diphenyl oxide product corresponding in chlorine content to trichloro-phenyl-diphenyl oxide is a liquid;

(4) That my chlorinated and/or brominated products containing more than 4 atoms of combined halogen per mol. of halogenated phenyl-diphenyl oxide are non-crystalline resins at room temperature.

Obviously, my resinous products cintaining 4 or more atoms of combined halogen per mol. thereof, may be prepared by chlorinating or brominating either phenyl-diphenyl oxide or a lower halogenated phenyl-diphenyl oxide, e. g. monochloro- or dibromo-phenyl-diphenyl oxide.

In the claims, the expression "lower halogenated phenyl-diphenyl oxide" shall be understood to refer to a halogenated phenyl-diphenyl oxide containing a lesser number of atoms of combined halogen than is desired in the final product.

Other modes of applying the principle of my invention may be employed, change being made as regards the method or compositions herein disclosed, provided the steps or ingredients stated by any of the following claims or the equivalent of such stated steps or ingredients be employed.

I therefore particularly point out and distinctly claim as my invention:—

1. In a method of making a halogenated phenyl-diphenyl oxide, the step which consists in reacting a phenyl-diphenyl oxide with a halogen selected from the class consisting of bromine and chlorine.

2. In a method of making a halogenated phenyl-diphenyl oxide, the steps which consist in reacting a phenyl-diphenyl oxide with a halogen selected from the class consisting of bromine and chlorine, and heating the reaction mixture to a temperature sufficient substantially to decompose halogen addition compounds contained therein.

3. In a method of making a halogenated phenyl-diphenyl oxide, the step which consists in reacting a phenyl-diphenyl oxide with a halogen selected from the class consisting of bromine and chlorine in the presence of a halogenation catalyst at a temperature sufficient substantially to prevent formation of halogen addition compounds.

4. In a method of making a halogenated phenyl-diphenyl oxide, the steps which consist in reacting a phenyl-diphenyl oxide with a halogen selected from the class consisting of bromine and chlorine at a temperature sufficient substantially to prevent formation of halogen addition compounds, and distilling the halogenated product.

5. In a method of making a resinous material, the step which consists in reacting a material selected from the class consisting of phenyl-diphenyl oxides and lower halogenated phenyl-diphenyl oxides with sufficient halogen selected from the class consisting of bromine and chlorine to form a halogenated phenyl-diphenyl oxide mixture having a halogen content corresponding to at least 4 atoms of combined halogen per mol. of halogenated phenyl-diphenyl oxide.

6. In a method of making a resinous material, the step which consists in reacting a material selected from the class consisting of phenyl-diphenyl oxides and lower halogenated phenyl-diphenyl oxides with sufficient halogen selected from the class consisting of bromine and chlorine to form a halogenated phenyl-diphenyl oxide mixture having a halogen content corresponding to at least 4 atoms of combined halogen per mol. of halogenated phenyl-diphenyl oxide, said halogenation being carried out in the presence of a halogenation catalyst at a temperature sufficient to prevent formation of halogen addition compounds.

7. In a method of making a resinous material, the steps which consist in reacting a compound selected from the class consisting of phenyl-diphenyl oxides and lower halogenated phenyl-diphenyl oxides with sufficient halogen selected from the class consisting of bromine and chlorine to form a halogenated phenyl-diphenyl oxide mixture having a halogen content corresponding to at least 4 atoms of combined halogen per mol. of halogenated phenyl-diphenyl oxide, said halogenation being carried out in the presence both of a halogenation catalyst and of a solvent which is less susceptible to halogenation than are the phenyl-diphenyl oxide compounds under treatment, heating the reaction mixture to a temperature sufficient substantially to decompose hydrogen halide addition compounds contained therein, and thereafter distilling the halogenated product.

8. In a method of making a brominated phenyl-diphenyl oxide, the step which consists in reacting a phenyl-diphenyl oxide with bromine.

9. In a method of making a brominated phenyl-diphenyl oxide, the step which consists in reacting a phenyl-diphenyl oxide with bromine in the presence of a solvent which is less susceptible to bromination than are the phenyl-diphenyl oxide compounds under treatment.

10. In a method of making a resinous material, the step which consists in reacting phenyl-diphenyl oxide with at least 4 molecular equivalents of bromine.

11. In a method of making a resinous material, the step which consists in reacting phenyl-diphenyl oxide with at least 4 molecular equivalents of bromine at a temperature above about 75° C.

12. In a method of making a resinous material, the step which consists in reacting phenyl-diphenyl oxide with at least 4 molecular equivalents of bromine in the presence of a halogenation catalyst at a temperature above about 75° C. and sufficiently high to maintain the reaction mixture in liquid condition.

13. In a method of making a chlorinated phenyl-diphenyl oxide, the step which consists in reacting a phenyl-diphenyl oxide with chlorine.

14. In a method of making a resinous material, the step which consists in reacting phenyl-diphenyl oxide with at least 4 molecular equivalents of chlorine.

15. In a method of making a resinous material, the step which consists in reacting phenyl-diphenyl oxide with at least 4 molecular equivalents of chlorine at a temperature above about 145° C.

16. In a method of making a resinous material, the step which consists in reacting phenyl-diphenyl oxide with at least 4 molecular equivalents of chlorine in the presence of a halogenation catalyst at a temperature above about 145° C.

17. A halogenated phenyl-diphenyl oxide preparable by reacting phenyl-diphenyl oxide with a halogen selected from the class consisting of bromine and chlorine.

18. A resinous material preparable by reacting phenyl-diphenyl oxide with at least 4 molecular equivalents of a halogen selected from the class consisting of bromine and chlorine.

19. Chlorinated phenyl-diphenyl oxide, preparable by reacting chlorine with phenyl-diphenyl oxide, and having a chlorine content corresponding to from 1 to 8 atoms of combined chlorine per mol. thereof.

20. Chlorinated phenyl-diphenyl oxide, preparable by reacting chlorine with phenyl-diphenyl oxide, and having a chlorine content corresponding to from 3 to 8 atoms of combined chlorine per mol. thereof, said material varying in physical characteristics from a viscous liquid to a solid non-crystalline resin at room temperature, according to its increasing chlorine content.

21. A chlorinated phenyl-diphenyl oxide preparable by reacting phenyl-diphenyl oxide with chlorine.

WESLEY C. STOESSER.